April 10, 1956  R. B. ORMSBY, JR  2,741,120
STRAIN GAGE AXIAL FORCE UNIT
Filed June 23, 1952  2 Sheets-Sheet 1
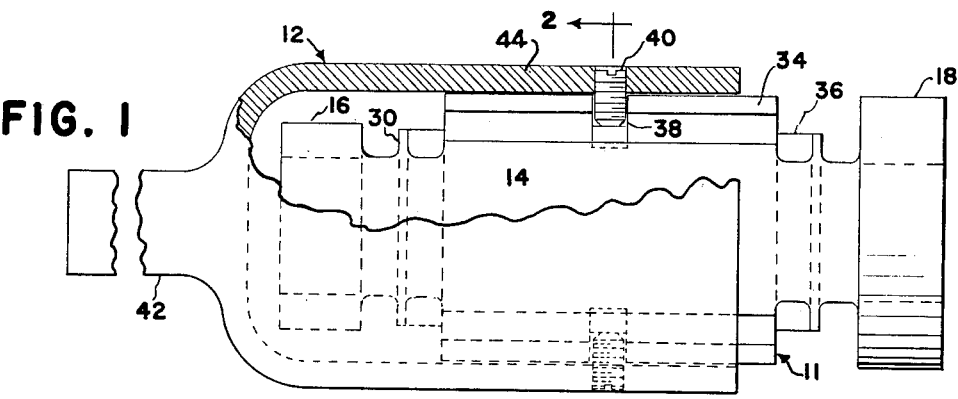
FIG. 1
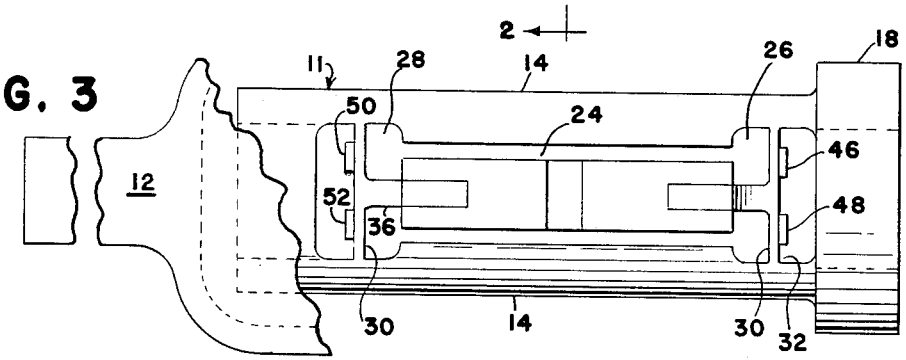
FIG. 3
FIG. 4
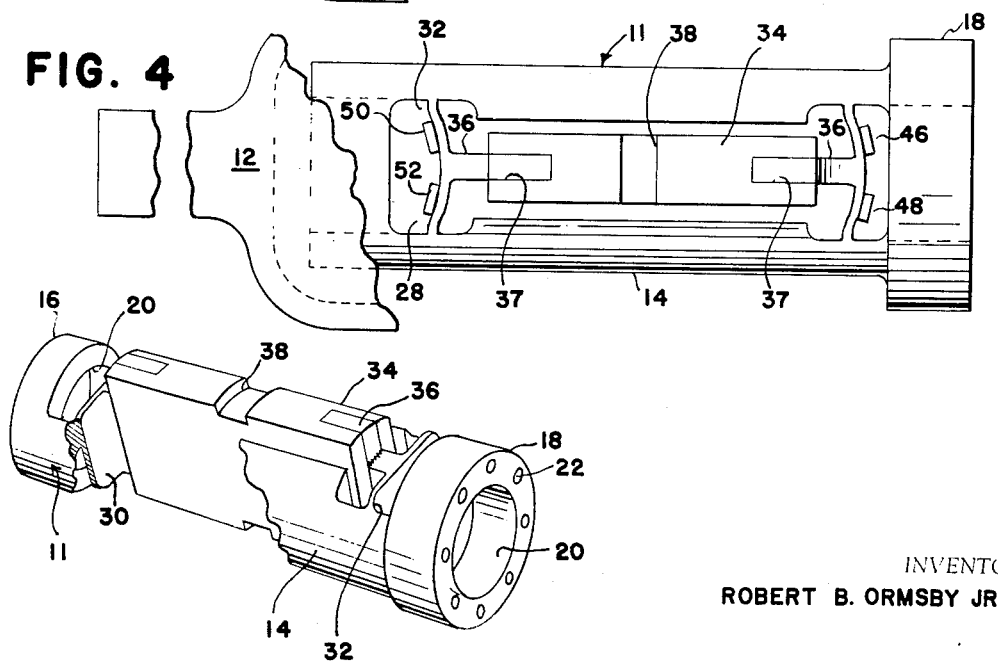
FIG. 5
INVENTOR
ROBERT B. ORMSBY JR.
BY
B. L. Zangwill
ATTORNEY.

April 10, 1956 R. B. ORMSBY, JR 2,741,120
STRAIN GAGE AXIAL FORCE UNIT
Filed June 23, 1952 2 Sheets-Sheet 2

INVENTOR
ROBERT B. ORMSBY JR.

BY B. L. Zangwill
ATTORNEY

United States Patent Office 2,741,120
Patented Apr. 10, 1956

2,741,120

STRAIN GAGE AXIAL FORCE UNIT

Robert B. Ormsby, Jr., Arlington, Va., assignor to the United States of America as represented by the Secretary of the Navy Application June 23, 1952, Serial No. 295,144

7 Claims. (Cl. 73—141)

(Granted under Title 35, U. S. Code (1952), sec. 266)

The invention described herein may be manufactured and used by or for the Government of the United States of America for governmental purposes without the payment of any royalties thereon or therefor.

The present invention relates to a measuring instrument and, more particularly, to an axial force measuring instrument for measuring the stresses and strains in functional and structural components of mechanical devices, aircraft, stationary structures, or the like, exposed to static or dynamic loads.

In the testing of various components of machinery or the like, wherein force measuring instruments are employed, it is advantageous to use a force measuring instrument within the unit under test; but this can be an extremely difficult task in instances where the space available for the instrument is limited. An especially difficult problem is encountered in connection with axial force measuring instruments for measuring relatively small axial forces with a fine degree of accuracy as free as possible from the disturbing interaction of normal forces and twisting moments inherently involved. With small sized instruments, the problem is made increasingly difficult because of the need to provide an instrument having the necessary strength to operate satisfactorily under large stresses and strains.

An object of the present invention is the provision of a force measuring apparatus which is highly sensitive and accurate under a wide variety of loads.

Another object is to provide a force measuring instrument having means responsive to an axial force independently of other forces.

A further object of the invention is the provision of a compact axial force measuring device having sufficient sturdiness to withstand large normal forces and twisting moments.

Still another object is to provide a desirable axial force measuring instrument of the type described which is simple to construct and easy to install and use.

A particular object of the invention is to provide an axial force measuring instrument for use in airplane models that are to be tested in high velocity wind tunnels.

With the foregoing and other objects in view, as will hereinafter more fully appear and which will be more particularly pointed out in the appended claims, reference is now made to the following description taken in connection with the accompanying drawings in which:

Fig. 1 is a side elevation view of an axial force measuring instrument and an actuating member therefor embodying the principles of the invention;

Fig. 3 is a top view of the apparatus of Fig. 1 when no load is applied thereto;

Fig. 4 is a top view of the apparatus, similar to Fig. 2, but when a load is applied thereto, the deflections of the flexible elements being shown greatly exaggerated for clarity of illustration;

Fig. 5 is a perspective view, partly in section, of an axial force responsive element comprising the instrument;

Figure 8:
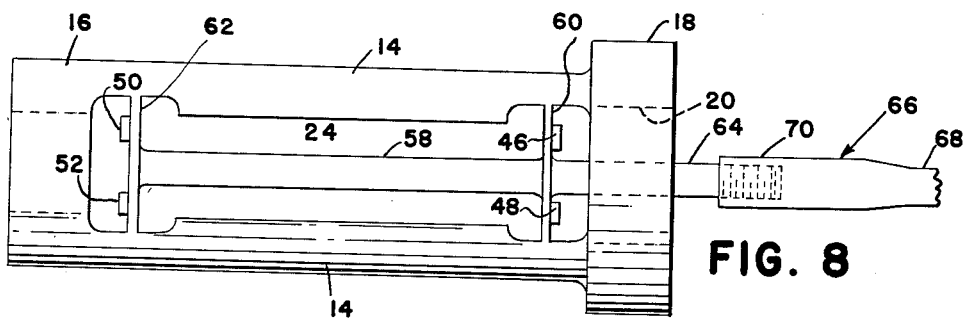
Fig. 8 is a top view of another modification of an axial force measuring instrument embodying the invention.

The preferred embodiment of the present invention comprises a symmetrical, compact axial force measuring instrument including a force transmitting member secured to a transverse flexible element which is flexed or displaced when the instrument is subjected to axial distortion. The flexible element carries a plurality of strain gages adapted to indicate the deflection of the flexible element whereby the axial distorting force may be measured. The instrument is symmetrical and so designed that the normal forces and the pitching moments are transferred to the transverse flexible element as a shear force, to which the strain gages do not respond, since the strain gages react only to tension and compression existing in said transverse flexible element.

Referring now to the drawings, wherein like reference characters designate like or corresponding parts throughout the several views, there is shown in Figs. 1–5 a preferred embodiment of the present invention in which an axial force measuring instrument 11 and a cylindrical actuating member 12 therefor are adapted to be secured to spaced points of a machine under test to transmit an axial load therebetween.

The axial force responsive element 11, as indicated in Figs. 3, 4 and 5, includes a pair of spaced longitudinal parallel side frame elements extending to and between a circular ring-shaped end flange 16 and a circular ring-shaped securing flange 18, the flanges having central holes 20 therein. The frame elements 14 and the flanges 16 and 18 are secured, as by welding, into a unitary and integral piece in the form of an elongated protective cage or frame. The end flange 18 of the frame is adapted to be anchored to a supporting structure and to this end, the body of the flange 18 is provided with a plurality of longitudinal circumferentially displaced threaded holes 22 by means of which the frame may be secured to the member under test in any suitable way. It is to be understood, however, that any suitable type of fastening means may be utilized, such as welding or clamping, but, in the illustrated embodiment, the use of a plurality of bolts has been found to provide a secure attachment which permits easy installation and removal.

Incorporated centrally between the side frame elements 14, the end flange 16 and the securing flange 18 is a longitudinally extending through slot 24 which merges at its ends into a pair of enlarged chambers 26 and 28, formed by cutting away adjacent areas of the side flange elements 14 and situated near the respective ends of the side frame elements 14 adjoining the flanges 16, 18. Disposed within each of the chambers and effectively dividing the chambers into two portions, is a transversely arranged linearly flexible diaphragm or drag web 30 rigidly secured at its ends 32 to the inner side of the side frame elements 14. The two webs 30 are parallel and axially aligned with their centers on the axis of the instrument. Web projections 36 extend inwardly from the webs 30 and are integral therewith. The webs 30 and the rest of the measuring instrument 11 are constructed from steel having a high modulus of resilience, such as vanadium or chromium-vanadium steels, heat treated to approximately Rockwell C20 or higher. Accordingly, the webs will be linearly elastic and sufficiently sensitive and accurate under a wide variety of loads. Interposed between the drag webs and located within the slot 24 is a longitudinal force transmitting element 34 having at its ends a grooved portion 37 connected, as for example, by silver soldering, to the drag web projections 36. The drag web projections are constructed integral with the rest of the webs 30 at the mid portion of their interior surfaces such that any motion imparted to the force transmitting element 34, by an axial force, will be transmitted to the mid portions of the drag webs to deflect the drag webs in the direction of the force.

The force transmitting element 34 is constructed in such a manner that it extends slightly above and below the maximum limits of the side frame elements 14 as clearly shown in Fig. 1. A pair of grooves or notches 38, located between the ends on the upper and lower surfaces of the force transmitting element and reaching a depth slightly less than the maximum height of the frame elements, are provided to coact with set-screws 40 of the cylindrical actuating member 12; the notch and set-screws serving to transfer axial motion of the actuating member 12 to the force transmitting element 34. The cylindrical actuating member consists of a securing member 42 adapted to be attached to an axial load under test in any suitable manner, and a cylindrical sleeve structure 44 normally partially surrounding the axial force measuring instrument, as illustrated in Figure 1. Thus, to securely attach the cylindrical actuating member to the axial force measuring unit, it is merely necessary to place the measuring instrument within the cylindrical actuating member, to revolve the measuring unit until the grooves and set-screws are aligned and finally to tighten the set-screws. It can be clearly seen that an axial force on the cylindrical actuating member will be transmitted to the force transmitting element.

In actual use, the cylindrical actuating member may be secured to a component of a structural unit, but in installations where the space limitations are critical, the mounting element may be part of the actual frame or structure under test, modified to receive the unit in a suitable manner, thus permitting the use of the measuring instrument within an exceedingly small space. It is noted that a set-screw and groove connection has been illustrated, however, any suitable removable or disconnectable connection such as threading or bolting may be employed depending upon the particular application of the measuring unit.

Suitably secured upon the side portions of each of the flexible drag webs are a plurality of strain gages 46, 48, 50 and 52 such as the resistance type described in U. S. Letters Patent 2,292,549 issued to E. E. Simmons. Strain gages of this type depend upon the principle that the resistance of a wire varies in proportion to its length and inversely with its cross-section, both of which are affected inversely when the wire is stretched within the range of its elastic limits. Elongation of the wire thus increases the resistance thereof. This resistance change is relatively small but may accurately be measured by suitable electrical circuits such as, for instance, a Wheatstone bridge arrangement. Each of the strain gages 46, 48, 50 and 52 are secured to the surface of its corresponding web by suitable means such as adhesive means and is positioned such that upon movement of the drag web, the expansion and contraction of the web surfaces vary the length and cross-section of the strain gage attached thereto; thereby changing the resistance properties therein.

As explained above, it will be appreciated that any lateral motion imparted to the cylindrical actuating member 12 by an external force, will be transferred to the transmitting member 34 in a direction depending on the initial direction given to the member 12. Since the transmitting element 34 is directly secured to the flexible drag webs 30, the latter elements, due to their inherent characteristics, will deflect with their surfaces either expanding or contracting, depending on the direction of motion applied, as clearly shown in Fig. 4 wherein the flexing of the drag webs are greatly exaggerated for purposes of illustration. Strain gages 46 and 48 attached to a drag web 30 will be slightly stretched or expanded as a result of the outward flexing of the web with its expanded surface while strain gages 50 and 52 will be slightly compressed by the compressed surface of the inwardly moving drag web; hence, the resultant resistances of the strain gages are proportional to the deflection of the drag webs, which in turn flex in proportion to the force applied thereto; therefore, the comparison of the resistances of the several strain gages will provide an accurate indication of the forces applied to the measuring instrument.

Figure 9:
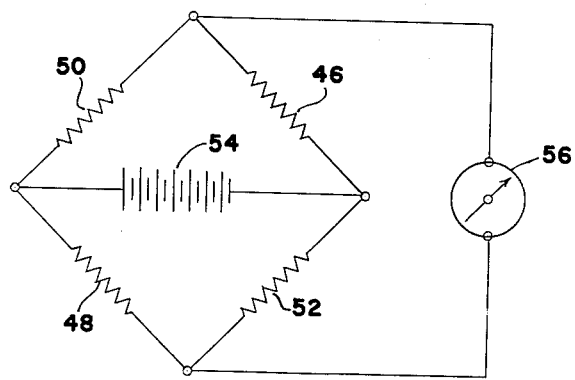
Fig. 9 is a wiring diagram used in conjunction with the instant invention.

A suitable circuit for the comparison of these resistances is illustrated in Fig. 9 although other and different circuits may be used. A source of potential 54 is inserted across the legs of a conventional Wheatstone bridge, which legs consist of the resistance elements of the individual strain gages 46, 48, 50 and 52 arranged such that the strain gage resistances 50 and 52, disposed on one surface of a drag web, are placed in the opposite legs of the bridge while strain gage resistances 46 and 48 situated on the other side of the drag webs are in the other legs of the Wheatstone bridge. Thus, with this arrangement, two strain gages oppositely disposed upon the drag webs are connected in "bucking" relationship with each other and with the other two oppositely disposed and "bucking" strain gages, to effectively provide a maximum deflection upon a galvanometer 56 placed in the circuit in the usual manner. At times, it may be preferable to incorporate only one of the strain gages in the bridge circuit at any one time, in which case, standard resistances replace the other three strain gage resistances in the circuit.

Figure 6:
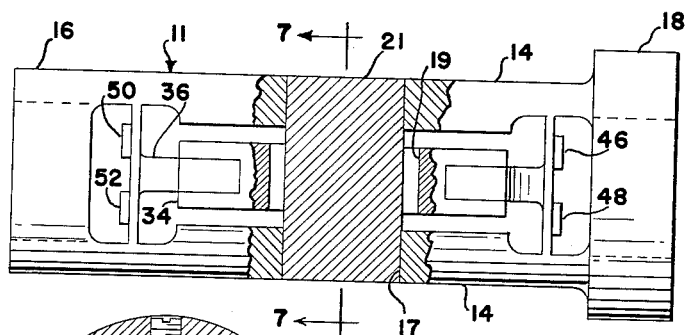
Fig. 6 is a plan view, partly in section, of a modification of the device.
Figure 2:
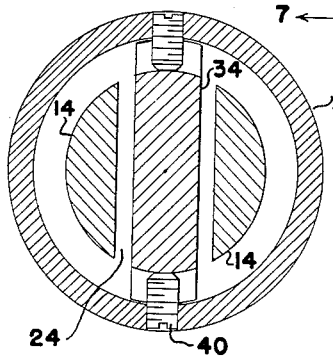
Fig. 2 is a cross-sectional view taken substantially on line 2—2 of Fig. 1 looking in the direction of the arrows.
Figure 7:
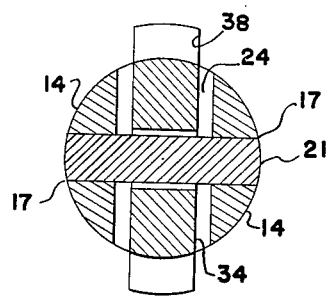
Fig. 7 is a sectional view of the device taken on the line 7—7 of Figure 6 looking in the direction of the arrows.

Referring now to the modification shown in Figs. 6 and 7, there is shown an axial force measuring instrument similar to the embodiment shown in Figs. 1–5. However, the side frame elements 14 have constructed therein laterally aligned apertures 17, midway between the end flange 16 and the securing flange 18, as clearly shown in Fig. 6. In lateral alignment with apertures 17, is aperture 19 constructed in the force transmitting element 34 to permit the reinforcement member 21 to pass therethrough unobstructed. The member 21 is rigidly secured within apertures 17, of the frame elements 14, by any conventional methods, for example, silver soldering. The reinforcement member 21 passes through aperture 19, in the force transmitting element 34, as to leave sufficient clearance to permit the unobstructed axial movement of element 34 over all contemplated ranges of axial forces to be encounted by the measuring instrument 10. The utilization of reinforcement member 21 endows the force responsive element 11 with sufficient rigidity to substantially eliminate any relative deformation of frame elements 14 due to the action of static or dynamic twisting forces on the force responsive element 11. In this manner, the interaction of stresses in the flexible webs 30 is kept at a minimum.

Referring now to Fig. 8, there is shown a further modification of an axial force measuring instrument similar in construction to the measuring instrument disclosed in Figs. 1–5 and including side frame elements 14, end flange 16, securing flange 18, drag webs 60, 62 and strain gages 46, 48, 50 and 52. Incorporated between the drag webs 60, 62 within the slot 24 is an elongated force transmitting spacer bar 58 rigidly secured at its respective ends to the interior surfaces of the drag webs 60, 62 which spacer bar is operative to transmit to the drag web 62 any motion imparted to the bar by the drag web 60. Rigidly secured on the exterior surface of the drag web 60 at its midportion is an elongated force transmitting element 64 having a length such that it extends through the opening 20 to the exterior of the instrument housing whereby the force transmitting element 64 may be secured to a structural component under test. The force transmitting element may be directly connected to the structural component, however it is preferable to provide a removable or disconnectable connection to an actuator which is securely attached to a structural component. As disclosed, an actuating member 66 having a securing arm 68, adapted to be securely connected to a structural component by any suitable means is extended to include an internally threaded socket 70 threadably engaging the threaded outer end of the force transmitting element 64. Strain gages 46, 48, 50 and 52 are secured to the outer edges of the drag webs in any suitable manner and are used to indicate the amount of force applied to the axial force measuring instrument in the same manner as disclosed in relation to the axial force measuring instrument of Figs. 1–4.

It can be seen from the above description that a sturdy axial force measuring instrument is provided, in that all elements of the force responsive elements are constructed to form a single unitary body, capable of being made in a small compact unit and yet, due to its manner of construction, able to withstand large normal forces and twisting moments. Also the attachment of the drag web at its ends to the side frame elements, the effective securement of the force transmitting element to the mid-portion of a drag web, and the attachment of strain gages on opposite sides of the drag web, provides a symmetrically axial force measuring balanced instrument; wherefore any normal forces and twisting moments of which the instrument may be subject to, are transferred through the drag web as shear to which a strain gage attached to the drag web, does not respond. Accordingly, it has been shown that a small, compact axial force measuring instrument has been provided having a rigid and strong construction enabling it to withstand large forces, and yet have the ability to measure an axial force component with an accuracy not previously attained. An embodiment as shown substantially to scale in Fig. 1 having a length of 3 inches was used to measure axial forces in a range from zero to approximately 50 pounds, with a high sensitivity and a minimum interaction of the forces. In this embodiment the drag web thickness was 30 thousands of an inch, this thickness being shown exaggerated in the drawing for purposes of clarity. However, it is to be understood that the invention is not limited to drag webs of this thickness.

Obviously many modifications and variations of the present invention are possible in the light of the above teachings. It is therefore to be understood that within the scope of the appended claims the invention may be practiced otherwise than as specifically described.

What is claimed is:

1. A force measuring device comprising a cylindrically-shaped mounting member having an axis and circular securing means at one end thereof; said cylindrically-shaped mounting member having two linear elastic webs; said linear elastic webs having their respective faces parallel and axially spaced from each other and from said securing means; said linear elastic webs having end portions fixedly connected with said cylindrically-shaped mounting member and located in planes perpendicular to the axis of said cylindrically-shaped mounting member; a force transmitting element located within said cylindrically-shaped mounting member and fixedly secured to the opposing inner faces of said linear elastic webs, whereby said force transmitting element and said linear elastic webs are axially and integrally movable relative to said cylindrically-shaped mounting member, actuating means removably connected to said force transmitting element at a point thereof located between the opposing inner faces of said linear elastic webs, said force transmitting element extending slightly beyond the surface of said cylindrically-shaped mounting member to facilitate connection with said actuating means; and a pair of force measuring units attached to the outer faces of said linear elastic webs to measure a force applied to the device.

2. A force measuring device as disclosed in claim 1, but further characterized by said cylindrically-shaped mounting member comprising a pair of longitudinally extending frame elements in parallel relationship to each other, said frame elements having a first end integrally secured to a circular end flange and a second end integrally secured to said circular securing means, said frame elements having a transverse reinforcing member secured to each of said frame elements, and said force transmitting element having a transverse aperture adapted to permit said reinforcing member to freely pass therethrough.

3. In a measuring instrument for indicating the stresses and strains of a structural component, a single unitary member comprising a pair of longitudinally extending frame elements in parallel relationship to one another, a circular end flange and a circular securing flange connected to said frame elements respectively, a chamber formed by said frame and flange members near each end of the frame elements, a longitudinally extending slot interconnecting said chambers, a transverse flexible member disposed in each of said chambers and secured at their ends to said frame elements, a longitudinal force transmitting element disposed in said slot and attached at its respective ends to the mid-sections of each of said flexible members whereby said force transmitting element and said flexible members may be moved in unison, an actuating member operatively connected to said transmitting element, and a plurality of strain gages rigidly secured to said flexible members and indicating the movement of said flexible members, whereby any force applied to the instrument through the actuating member may be measured.

4. In a measuring instrument as disclosed in claim 3, but further characterized by said pair of longitudinally extending frame elements having a transverse reinforcing member secured to each of said frame elements.

5. In a measuring instrument as disclosed in claim 4, but further characterized by said transverse reinforcing member passing through an aperture in said longitudinal force transmitting element.

6. A measuring instrument for indicating the stresses and strains of structural components, comprising a housing, said housing comprising a pair of spaced parallel frame elements, an end flange fixedly connected to both frame elements at one extremity of the housing, a connector flange fixedly connected to both frame elements at the opposite end of the housing, thereby providing a slot in said housing between said frame elements, each frame element having a recessed area therein adjoining the extremities of the slot, the recessed areas in one frame element being located opposite those in the other frame element, thereby providing a widened area in said slot at each of its extremities, a pair of parallel linear elastic webs perpendicular to the frame elements, said webs being located within the respective widened areas of the slot, each web having opposite ends fixedly attached to the frame elements at the bottom of the respective recessed areas, a force transmitting plate between said frame elements, said plate being disposed in the slot provided in the housing, and having opposite ends fixedly secured to the center portion of each web; actuating means removably connected to said force transmitting plate whereby movement of said actuating means is transferred to said force transmitting plate and to each of said linear elastic webs, and a pair of stress and strain indicating means attached to each of said linear elastic webs whereby a force applied to the instrument may be measured.

7. A measuring instrument for indicating the stresses and strains of structural components, as set forth in claim 6, wherein said frame elements, flanges and webs are formed from one piece of material.

References Cited in the file of this patent

UNITED STATES PATENTS

| | | |
|---|---|---|
| 2,403,952 | Ruge | July 16, 1946 |
| 2,485,977 | Mains | Oct. 25, 1949 |
| 2,563,425 | Schaevitz | Aug. 7, 1951 |
| 2,590,626 | Jones | Mar. 25, 1952 |